(12) United States Patent
Bloom (10) Patent No.: US 7,907,338 B2  
(45) Date of Patent: Mar. 15, 2011

(54) MICROFABRICATED OPTICAL WAVE PLATE

(75) Inventor: David M. Bloom, Jackson, WY (US)

(73) Assignee: Alces Technology, Inc., Jackson, WY (US)

( * ) Notice: Subject to any disclaimer, the term of this patent is extended or adjusted under 35 U.S.C. 154(b) by 339 days.

(21) Appl. No.: 12/053,477

(22) Filed: Mar. 21, 2008

(65) Prior Publication Data

US 2009/0237785 A1    Sep. 24, 2009

(51) Int. Cl.  
*G02B 27/28* (2006.01)
(52) U.S. Cl. .................... 359/486; 359/578; 359/847
(58) Field of Classification Search .................. 359/486, 359/578, 846, 847, 849  
See application file for complete search history.

(56) References Cited

U.S. PATENT DOCUMENTS

| | | | |
|---|---|---|---|
| 2,224,214 A | 12/1940 | Brown | |
| 3,046,839 A | 7/1962 | Bird et al. | |
| 4,104,598 A | 8/1978 | Abrams | |
| 6,108,131 A | 8/2000 | Hansen et al. | |
| 6,122,103 A | 9/2000 | Perkins et al. | |
| 6,447,120 B1 | 9/2002 | Hansen et al. | |
| 6,590,695 B1 | 7/2003 | Kurtz et al. | |
| 6,707,595 B2 | 3/2004 | Kutz et al. | |
| 6,805,445 B2 | 10/2004 | Silverstein et al. | |
| 7,054,051 B1* | 5/2006 | Bloom | 359/276 |
| 7,218,364 B2* | 5/2007 | Brindel | 349/114 |
| 7,221,420 B2 | 5/2007 | Silverstein et al. | |
| 7,614,757 B2* | 11/2009 | Nesterenko et al. | 362/19 |
| 2003/0020094 A1* | 1/2003 | Shrauger | 257/200 |
| 2006/0114544 A1 | 6/2006 | Bloom et al. | |
| 2007/0047214 A1 | 3/2007 | Nesterenko et al. | |
| 2007/0075942 A1* | 4/2007 | Martin et al. | 345/84 |
| 2007/0116405 A1 | 5/2007 | Kane et al. | |
| 2008/0062521 A1 | 3/2008 | Bloom | |
| 2009/0015902 A1* | 1/2009 | Powers et al. | 359/288 |
| 2010/0135004 A1* | 6/2010 | Epstein et al. | 362/97.2 |

OTHER PUBLICATIONS

Written opinion of the international searching authority and international search report in application PCT/US2009/037623 mailed on Jul. 31, 2009.

International Preliminary Report on Patentability issued on Sep. 21, 2010 for PCT/US2009/037623.

* cited by examiner

*Primary Examiner* — Frank G Font  
(74) *Attorney, Agent, or Firm* — NUPAT, LLC; Morrison Ulman (57) ABSTRACT

A microfabricated optical wave plate comprises a reflective polarizer and a mirror separated by a fixed or variable distance. The wave plate imparts a relative phase delay on polarization components of incident light, thereby transforming the overall polarization of the light.

20 Claims, 10 Drawing Sheets

MICROFABRICATED OPTICAL WAVE PLATE

TECHNICAL FIELD

The disclosure is generally related to the fields of optical micro-electromechanical systems (MEMS) devices, nano-optical-electromechanical systems (NOEMS), optical modulators, electro-optical devices, and polarization transforming devices.

BACKGROUND

Polarization transformation and electro-optic effects have been widely explored as physical foundations for optical devices. Optical MEMS devices, many involving microscopic mirrors, have also been the subject of intense development over the last fifteen years. However micro- or nano-fabricated devices that change the polarization of light and induce effects similar to electro-optical phenomena are not well known. An understanding of polarization and how it may be expressed in terms of linear combinations of orthogonal polarization states is necessary to understand polarization-based NOEMS or optical MEMS.

Linearly polarized light is characterized by an electric field vector of constant orientation. In contrast, unpolarized light has such a rapidly varying succession of different electric field orientations that no single polarization state is discernable. Unpolarized light may be represented as a superposition of equal-amplitude, incoherent, orthogonal, linearly polarized fields. A linear polarizer is a device that separates these two components. Circular polarization is a superposition of equal-amplitude, linearly polarized fields with a relative phase delay of $\pi/2$.

It is possible to separate a light beam into orthogonal polarization components, impart a phase delay upon one of the components, and then reassemble the components into a single beam. Operations of this type transform the polarization of the light beam. For example, if a linearly polarized beam is separated into two equal-amplitude, orthogonal polarization components, one of the components is phase delayed by $\pi/2$, and the phase shifted components are recombined, then the resulting polarization of the reassembled beam is circular polarization. A phase delay of $\pi$ transforms the polarization to linear polarization oriented perpendicular to the original polarization.

Birefringent wave plates are commonly used to change the polarization of an incident light beam by imparting a relative phase delay upon polarization components of the beam. In a birefringent wave plate, the index of refraction is not isotropic; it varies depending upon the orientation of the plate. When light passes through a birefringent wave plate, polarization components of the light are subjected to unequal indices of refraction and therefore experience a relative phase delay.

It is possible to temporarily induce birefringence in electro-optic materials by applying an electric field. In the Kerr effect and the Pockels effect, an isotropic, transparent substance takes on the characteristics of a uniaxial birefringent crystal in the presence of an electric field. The difference in index of refraction in directions parallel and perpendicular to the electric field is proportional to the field in the Pockels effect and to the square of the field in the Kerr effect. An example of an electro-optic device is a Kerr shutter which is made by placing a Kerr cell (i.e. a suitable substance across which an electric field is applied) between crossed linear polarizers. When no field is applied, no light is transmitted as the polarizers are crossed. The application of a modulating voltage generates a field causing the cell to function as a variable wave plate and thus opening the shutter proportionately. Examples of electro-optic materials include carbon disulfide (liquid) and barium titanate (solid).

BRIEF DESCRIPTION OF THE DRAWINGS

The drawings are heuristic for clarity.

DETAILED DESCRIPTION

A "microfabricated optical wave plate" is a new optical element constructed from a reflective polarizer operating at near-normal incidence and a microfabricated mirror (e.g. a MEMS mirror) that moves to adjust the separation between the mirror and the polarizer. A microfabricated optical wave plate transforms the polarization of light incident upon it. The degree of polarization transformation can be changed rapidly by actuating the mirror.

A microfabricated optical wave plate operates by separating light into orthogonal polarization components, imparting a phase delay on one of them, and then recombining the polarization components. The magnitude of the phase delay, and the orientation of the polarization of input light with respect to the orientation of the reflective polarizer, determines the relationship between input and output polarizations.

When a microfabricated optical wave plate is combined with a polarizer/analyzer it forms a light modulator that is useful in a wide variety of applications. The modulator operates over broad temperature and wavelength ranges and has low power requirements. The switching speed of the modulator is several orders of magnitude faster than comparable liquid crystal devices. Further, the modulator can be designed to operate with ambient light. For all of these reasons a modulator based on a microfabricated optical wave plate is convenient for display applications.

A microfabricated optical wave plate is somewhat reminiscent of the Kerr cell mentioned earlier in that both devices cause orthogonal polarizations of light to experience a relative phase shift in proportion to the square of an applied voltage. In that sense, the two devices can be characterized by a third-order non-linear susceptibility, often denoted $\chi_3$. Of course, the mechanism by which the application of a voltage leads to optical phase shifts is completely different in the two devices. In the Kerr cell, the voltage is applied across a non-linear optical medium; in a microfabricated optical wave plate incorporating a MEMS mirror, the voltage moves a mirror by electrostatic attraction.

Figure 1:
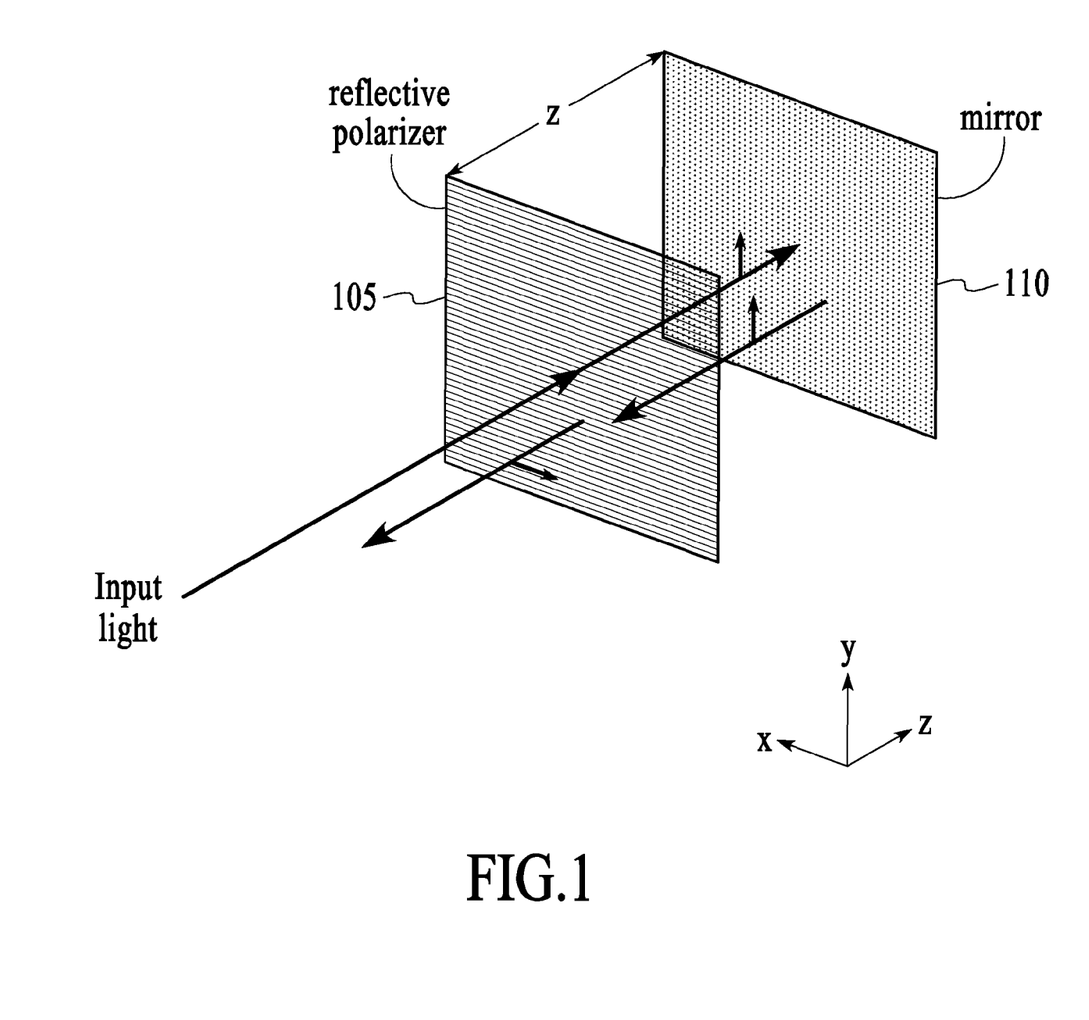
FIG. 1 shows components of a microfabricated optical wave plate.

FIG. 1 shows components of a microfabricated optical wave plate. The wave plate comprises a reflective polarizer 105 separated from a mirror 110 by a short distance, denoted "z". The mirror may move in response to electrostatic attraction between microfabricated structures or in response to forces resulting from the compression or tension of microfabricated structures or by another mechanism. In the microfabricated optical wave plate, an actuation mechanism, such as a micro-electromechanical system, moves either the mirror or the polarizer, or both, so that the separation between them, z, can be changed. It is also useful for certain applications to make a static microfabricated optical wave plates in which the separation, z, is fixed. Some static wave plates include a variable index material to alter the optical path length inside the plate.

The polarizer in a microfabricated optical wave plate, such as that illustrated schematically in FIG. 1, is a reflective polarizer. A reflective polarizer, as distinguished from an absorptive polarizer, is one that transmits one polarization and reflects the orthogonal polarization. (An absorptive polarizer is needed in conjunction with a microfabricated optical wave plate to make certain devices, but the wave plates itself comprises a reflective polarizer.) The reflective polarizer and the mirror are parallel to each other or nearly so, and the microfabricated optical wave plate works on light that shines upon the polarizer at near-normal incidence. While there is no requirement that the light arrive exactly at normal incidence, the performance of the wave plate may be degraded at large angles away from normal incidence. Here "near-normal" may be defined as within twenty degrees away from normal.

As mentioned above, the microfabricated optical wave plate operates by separating light into orthogonal polarization components, imparting a phase delay on one of them, and then recombining the polarization components. When light shines upon polarizer 105 in FIG. 1, one polarization component is reflected while the orthogonal polarization component is transmitted. The transmitted polarization propagates toward the mirror, is reflected by it, and then returns toward, and is transmitted through, the polarizer. Light returning from the mirror is recombined at the polarizer with light that was reflected from the polarizer and did not travel to the mirror and back. The extra distance that the light reflected by the mirror travels results in a phase delay of $(2\pi/\lambda) \cdot 2z$, where $\lambda$ is the wavelength of the light and z is the distance between the polarizer and the mirror. To recap: the light incident upon the polarizer is split into orthogonal polarization components; one of these is reflected by the polarizer while the other travels to the mirror and back; when the two polarization components rejoin each other at the polarizer, one of them has undergone a phase shift of $(2\pi/\lambda) \cdot 2z$. The result of this manipulation of the relative phase of polarization components is that the overall polarization of the recombined light is transformed by an amount that depends upon the magnitude of the phase shift.

Further understanding of the microfabricated optical wave plate may be obtained by considering examples of its operation. The microfabricated optical wave plate operates in analogy to a birefringent crystal wave plate if such a wave plate could be made to have adjustable thickness. For example, the microfabricated optical wave plate acts as a half-wave plate when $$2z = \frac{\lambda}{2}.$$

In that case the roundtrip phase delay from the polarizer to the mirror and back is $\pi$. The axis defined by the polarization that is maximally transmitted by the polarizer is analogous to the c-axis of a birefringent crystal wave plate. If a linearly polarized input has its polarization oriented 45 degrees away from the axis, then the output polarization will be perpendicular to the input polarization. In general, for both birefringent crystal half-wave plates and microfabricated optical half-wave plates, the angle between the axis and the output polarization is twice the angle between the axis and the input polarization. Furthermore a half-wave plate is formed whenever the spacing is such that the round-trip optical path length between the polarizer and the mirror is equal to $(n+\frac{1}{2})$ times the wavelength of the incident light where n is zero or a positive integer (0, 1, 2, 3 ... ).

Similarly, a microfabricated optical wave plate operates as a quarter-wave plate when $$2z = \frac{\lambda}{4}.$$

When linearly polarized light is incident upon a quarter-wave plate—birefringent crystal or microfabricated—with its polarization at 45 degrees away from the wave plate axis the output light is circularly polarized. Furthermore a quarter-wave plate is formed whenever the spacing is such that the round-trip optical path length between the polarizer and the mirror is equal to $(n+\frac{1}{4})$ times the wavelength of the incident light where n is zero or a positive integer (0, 1, 2, 3 ... ). The microfabricated optical wave plate has flexibility in that its optical thickness can be varied by actuating the mirror to change z.

The microfabricated optical wave plate can be described in terms of Jones matrices:

$$(E_{x,out} \; E_{y,out}) = \begin{bmatrix} 1 & 0 \\ 0 & e^{j(\frac{2\pi}{\lambda})2z} \end{bmatrix} \cdot \begin{pmatrix} E_{x,in} \\ E_{y,in} \end{pmatrix}$$

Here E represents the electric field of the input or output, in the x or y direction as indicated by the subscripts. The Jones matrix formalism is useful to analyze the effect of placing a compensating, birefringent wave plate in front of the microfabricated optical wave plate.

One may rewrite the separation distance, z, as $z=z_0+\delta z$. Then, the Jones matrix for the combination of a microfabricated optical wave plate and a compensating, birefringent wave plate is obtained from the matrix product:

$$\begin{bmatrix} 1 & 0 \\ 0 & e^{j\phi} \end{bmatrix} \cdot \begin{bmatrix} 1 & 0 \\ 0 & e^{j(\frac{2\pi}{\lambda})2z_0} \end{bmatrix} \cdot \begin{bmatrix} 1 & 0 \\ 0 & e^{j(\frac{2\pi}{\lambda})2\delta z} \end{bmatrix}$$

If the compensating wave plate is designed such that $$\phi = -\left(\frac{2\pi}{\lambda}\right) \cdot 2z_0,$$

then the combination of the two wave plates acts as if the mirror is located in the same plane as the polarizer. As an example, consider a quartz compensating plate; in quartz, $\Delta n = n_e - n_o \cong 0.009$. If the spacing between the mirror and the polarizer is 2 μm, then a quartz compensator about 222 μm thick $$\left(\frac{2\ \mu m}{0.009} \cong 222\ \mu m\right)$$

provides compensation needed to make the overall device behave as if the mirror is located in the plane of the polarizer. The numbers mentioned here serve only to illustrate a particular example. Microfabricated optical wave plates may be designed with widely varying spacing and compensating plates may be made from materials other than quartz. Liquid crystal polymers, for example, are often used as compensating films with high $\Delta n$. Furthermore, compensating plates may be designed so that the combination birefringent and microfabricated wave plate behaves as if the mirror were placed behind, in the same plane as, or in front of, the polarizer.

Figure 2:
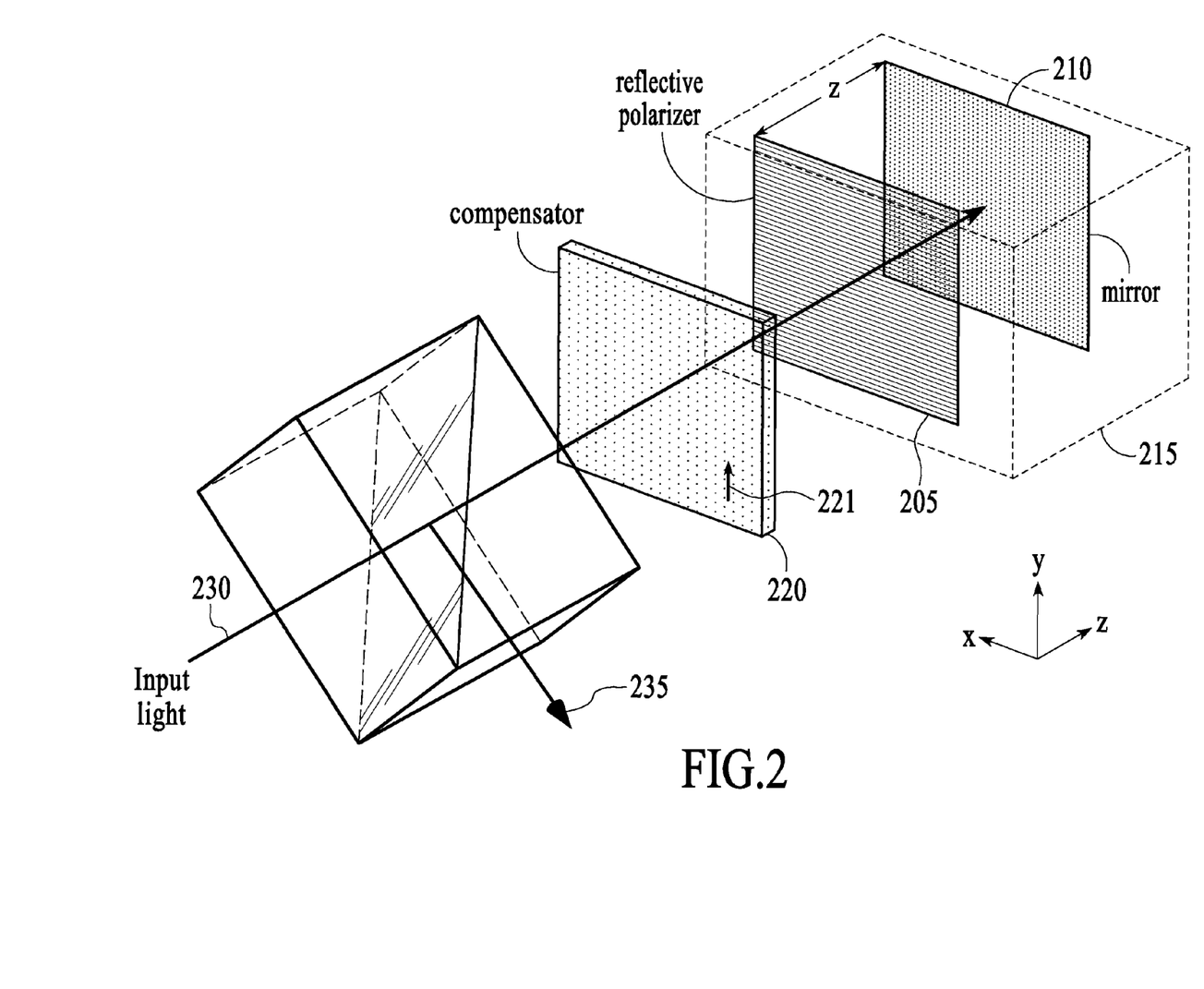
FIG. 2 shows a microfabricated optical wave plate with a compensator and a polarizing beam splitter.

FIG. 2 shows a microfabricated optical wave plate with a compensator and a polarizing beam splitter. In FIG. 2 input light beam 230 passes through polarizing beam splitter 235 and birefringent compensator 220 before arriving at microfabricated optical wave plate 215. Wave plate 215 comprises reflective polarizer 205, mirror 210, and a mechanism (not illustrated in this figure) for changing the distance, z, between the polarizer and the mirror. Light coming from polarizing beam splitter 225 arrives at compensator 220 with its polarization oriented at 45 degrees to the fast axis (whose orientation is indicated by arrow 221) of the compensator. This light may be though of as being composed of equal amplitude, orthogonally polarized components aligned with the x- and y-axes. In the compensator, the x-axis component of the light is retarded with respect to the y-axis component. In the wave plate, the y-axis component is retarded with respect to the x-axis component because the y-axis component travels to the mirror and back while the x-axis component is reflected by the polarizer. The compensator and wave plate may be designed such that these effects cancel each other for some initial separation, $z_0$, between the polarizer and the mirror. The transformed polarization of light returned by the compensator and wave plate is analyzed by the polarizing beam splitter. If the polarization is unchanged by the compensator and wave plate, then the returning light follows the same path as the input light. If the returning light is polarized 90 degrees away from the input light, then the polarizing beam splitter redirects the returning light in the direction indicated by arrow 235.

Embodiments of the reflective polarizer and mirror of the microfabricated optical wave plate shown in FIG. 2 and throughout this disclosure may be realized in several different forms. For example, Proflux™ Microwire™ wire grid polarizers (Moxtek, Orem, Utah) are suitable as reflective polarizers. Proflux™ Microwire™ polarizers are a type of wire grid polarizer that offer good performance and are available in variations optimized for high contrast or high transmission. Wire grid polarizers present a conductive short to light that is polarized parallel to the wires in the polarzer. Therefore light polarized with electric field parallel to the wires is reflected while light polarized perpendicular to the wires is transmitted. The wires in a wire grid polarizer need not be continuous across the face of the polarizer.

Structures similar to wire grid polarizers include stacks of alternating dielectric materials sliced such that light is incident upon a cross section of the stack. Other reflective polarizers may include those based on iodine crystals or silver nanocrystallites embedded in glass. Regardless of the physical basis of operation, a reflective polarizer is one that reflects one polarization while transmitting the orthogonal polarization.

Mirror designs suitable for the microfabricated optical wave plate include variations of the Texas Instruments digital mirror device (see, e.g. U.S. Pat. No. 4,566,935), the Reflectivity MEMS mirror device (see, e.g. U.S. Pat. No. 5,835,256), and ribbon-based MEMS mirrors. (The Reflectivity and Texas Instruments designs are based on tilting mirrors which may cause non-uniformity of polarization transformation across the mirror surface, but they may still be useful in some applications.) Examples of MEMS mirror designs based on ribbons are provided in connection with FIGS. 8-11. Other suitable mirror designs are those that provide movement toward and away from a light source without tilting; for example, piston actuators found in adaptive optical systems for astronomy or retinal imaging. Electrostatically actuated mirrors move in proportion to the square of an applied voltage; hence the analogy between the microfabricated optical wave plate and non-linear optical $\chi_3$ materials. Electrostatic actuation mechanisms are only one of many possible ways to actuate a MEMS mirror, however. For example, the mirror may be designed with heat sensitive supports.

Figure 3:
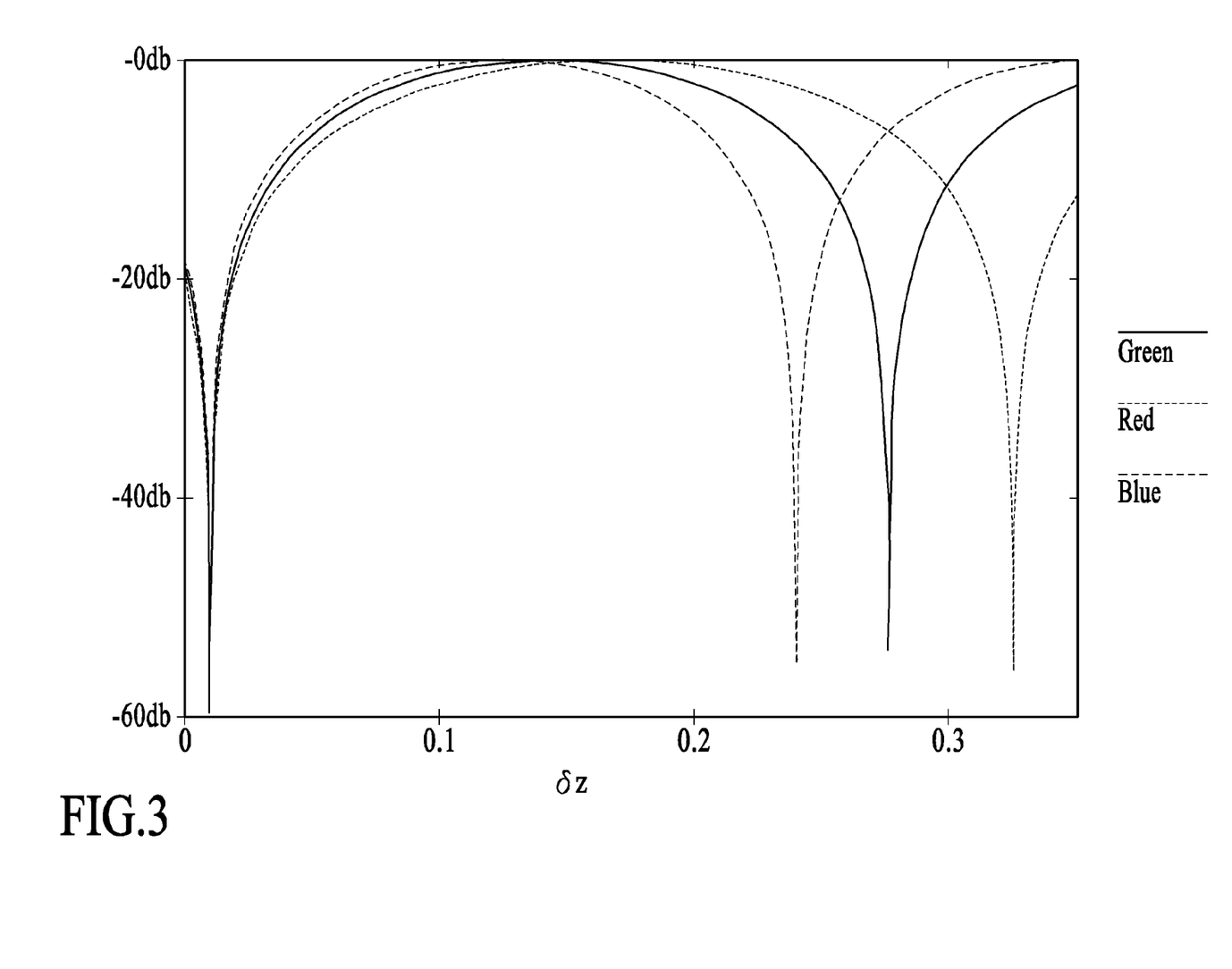
FIG. 3 shows results of a simulation of the operation of the apparatus of FIG. 2

FIG. 3 shows results of a simulation of the operation of the apparatus of FIG. 2. In FIG. 3, the horizontal axis of the graph represents the change in distance (i.e. $\delta z$) between the mirror 210 and the polarizer 205 in FIG. 2, while the vertical axis is the optical power at the output port 235 scaled by the input power and measured in dB. Results for representative red, green and blue wavelengths (630 nm, 532 nm and 460 nm respectively) are plotted. The same compensator is used for all wavelengths.

The output for all three wavelengths reaches a minimum near $\delta z=0$. (The compensator can be designed such that the minimum occurs at $\delta z=0$. Here, the null is placed slightly away from zero for clarity of illustration.) Although the maximum output for red, green and blue wavelengths occurs at different values of $\delta z$, the rate of change of output power versus $\delta z$ is small near the maximum. Therefore the output power for red and blue wavelengths is still nearly maximized when $\delta z$ is set to maximize the output power for green. Hence, this system offers high contrast between dark and bright states for red, green and blue wavelengths simultaneously.

Figure 4:
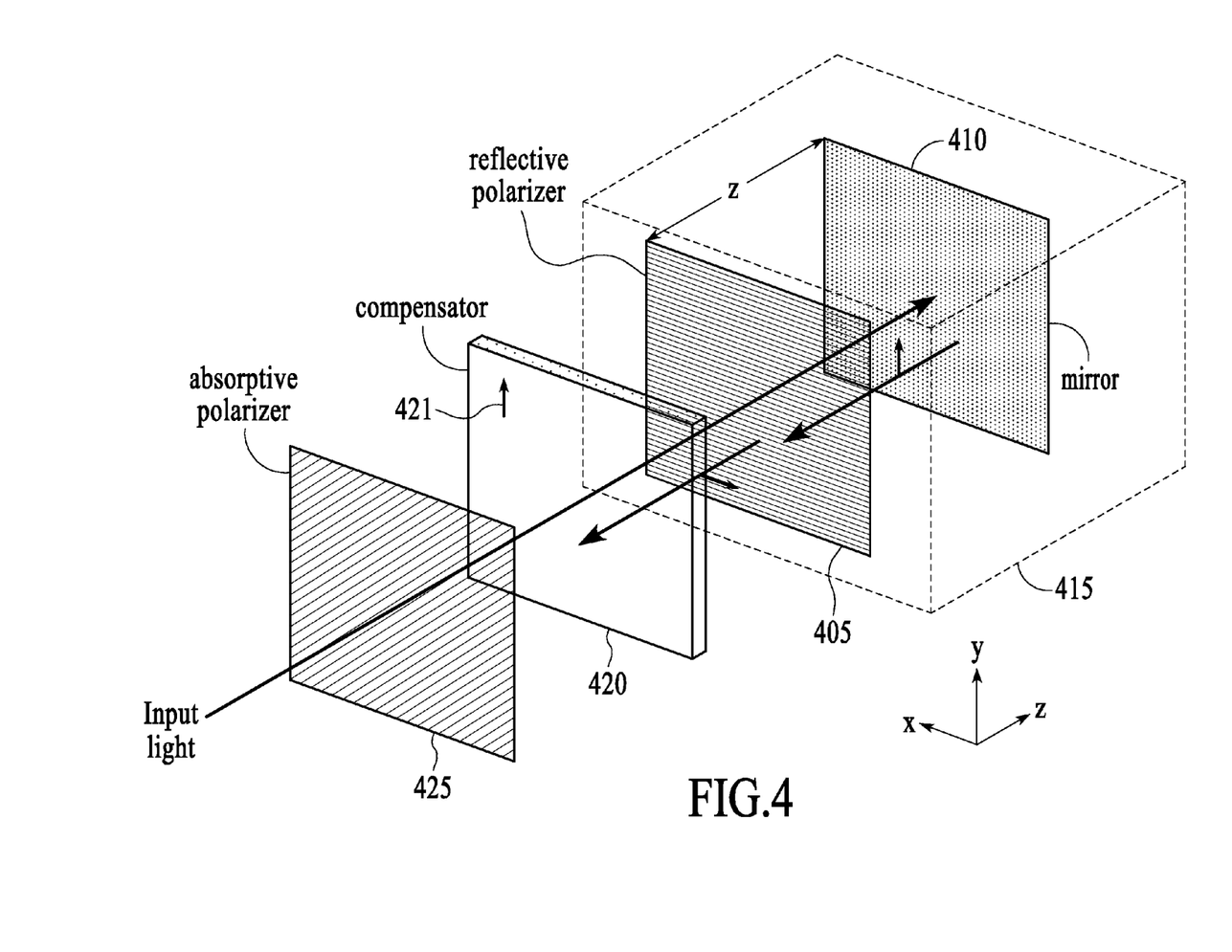
FIG. 4 shows a microfabricated optical wave plate with a compensator and an absorptive polarizer.

FIG. 4 shows a microfabricated optical wave plate with a compensator and an absorptive polarizer. This arrangement is suitable for unpolarized inputs as might be found in a daylight-readable display, for example. In FIG. 4 microfabricated optical wave plate 415 comprises mirror 410 and reflective polarizer 405. Compensator 420 is placed between the microfabricated optical wave plate and absorptive polarizer 425.

Compensator 420 is a birefringent element such as a birefringent crystal. Light rays polarized parallel to the x- and y-axes experience different indices of refraction within the compensator. The orientation of the fast axis of the compensator is indicated by arrow 421. Reflective polarizer 405 is oriented to transmit light polarized parallel to the y-axis while reflecting light parallel to the x-axis. As explained earlier, the compensator may be designed such that the phase delay between x- and y-polarized light passing through it is opposite the phase delay between x- and y-polarized light in the microfabricated optical wave plate for an initial separation, $z_0$. This makes the overall system operate as if the reflective polarizer and mirror were superimposed. Different compensator designs, for example using different thicknesses of birefringent material, lead to systems that operate as if the separation, z, between the reflective polarizer and the mirror were greater than or less than $z_0$; or even a negative number.

Absorptive polarizer 425 is oriented at 45 degrees to the x- or y-axis. Therefore light transmitted through the polarizer has x- and y-axis polarization components of equal amplitude. The phase delay experienced by these x- and y-axis polarization components as they travel through the compensator and microfabricated optical wave plate depends upon the distance z. Unpolarized input light is polarized by the absorptive polarizer, travels through the compensator, is reflected by the microfabricated optical wave plate, and passes back through the compensator before being analyzed by the absorptive polarizer. Depending on the polarization transformation achieved in the microfabricated optical wave plate, the system of FIG. 4 may appear dark (absorbing) or light (reflecting) or in between. The system of FIG. 4 therefore forms a modulator element for a display readable when illuminated by unpolarized light.

Figure 5:
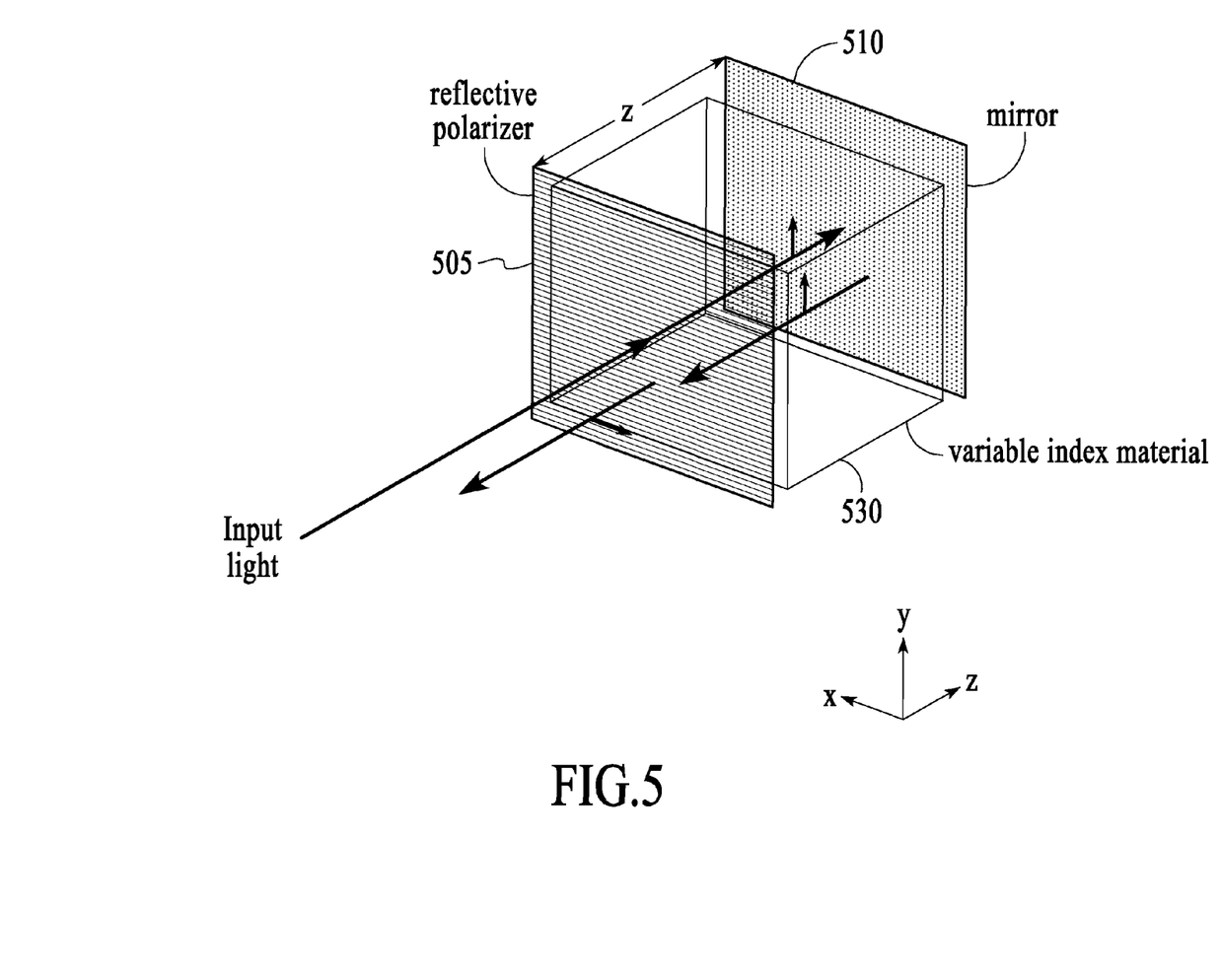
FIG. 5 shows a microfabricated optical wave plate comprising a variable index material.

FIG. 5 shows a microfabricated optical wave plate comprising a variable index material. The structure shown in FIG. 5 is similar to that shown in FIG. 1 with the exception that in FIG. 5 a variable index material 530 has been inserted between reflective polarizer 505 and mirror 510. As discussed above, the operation of a microfabricated optical wave plate depends upon imparting a relative phase shift upon orthogonal polarization components. In structures such as that illustrated in FIG. 1 this is accomplished by varying the optical path length travelled by one polarization component by varying the distance between the polarizer and the mirror. However, the optical path length between the polarizer and the mirror may be altered even without changing the distance, z, between the two components. Instead of varying z, the index of refraction in the region between the polarizer and the mirror may be modified. If the index of refraction is increased, for example, the optical path length is increased even though the distance, z, is unchanged. Variable index material 530 in FIG. 5 alters the optical path length between the polarizer and the mirror independent of whether or not the distance, z, between the polarizer and the mirror changes. One example of a variable index material is a liquid crystal whose index of refraction may be changed via the application of an electric field. Other examples include electro-optic materials such as potassium dihydrogen phosphate or lithium niobate. Further, a variable index material could comprise a flow cell containing a variable index liquid such as a variable concentration aqueous sugar solution. Microfabricated optical wave plates incorporating a variable index material may be designed for fixed distance, z, between the polarizer and the mirror or may also include a mechanism to vary the distance, z.

Figure 6A:
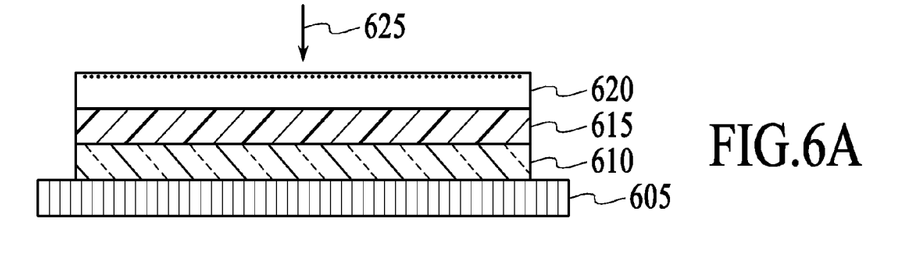
FIGS. 6A & 6B show fixed microfabricated optical wave plates fabricated on opaque and transparent substrates, respectively.
Figures 6B, 7:
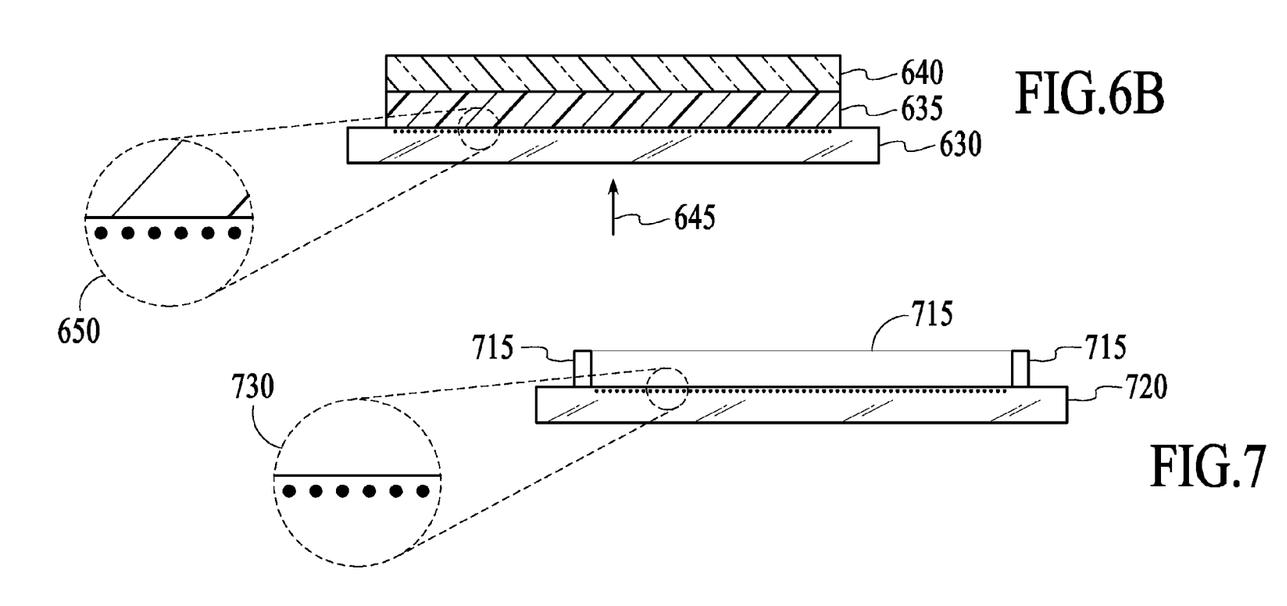
FIG. 7 shows a microfabricated optical wave plate comprising a flexible, reflective membrane.

FIGS. 6A & 6B show fixed microfabricated optical wave plates fabricated on opaque and transparent substrates, respectively. In FIG. 6A a microfabricated optical wave plate is fabricated on an opaque substrate 605 such as silicon or any other solid material. Built on the substrate are a reflective layer 610, dielectric layer 615 and polarizer layer 620. The reflective layer may be a metal, such as aluminum, silver or gold, or it may comprise a dielectric stack mirror. The dielectric layer is optically transparent and may optionally comprise a variable index material such as a liquid crystal. The polarizer layer is a reflective polarizer, illustrated in FIG. 6A as a wire grid polarizer. Consider, as an example, a fixed microfabricated optical wave plate according to FIG. 6A in which the substrate is silicon, the reflective layer is aluminum, the dielectric layer is silicon dioxide and the polarizer is a wire grid polarizer. Such a wave plate may be built to provide the characteristics of a traditional quarter- or half-wave plate or in fact any traditional wave plate. The fixed microfabricated optical wave plate operates in reflection, however. Light is incident upon the structure in the direction indicated by arrow 625 and returns in the opposite direction. Other examples of dielectric layers include: low-temperature deposited silicon dioxide, phosphosilicate glass, magnesium fluoride, calcium fluoride, etc. A closely related alternative to the structure shown in FIG. 6A is one in which a wire grid polarizer is created by lithographically patterning metal deposited on dielectric layer 615.

In FIG. 6B a fixed microfabricated optical wave plate is fabricated on a transparent substrate 630 such as glass. For example, the substrate may be the glass substrate of a wire grid polarizer as illustrated in FIG. 6B. Inset 650 shows a magnified end-view of wires in a wire grid polarizer. Built upon the substrate are a dielectric layer 635 and a reflective layer 640. The dielectric layer is optically transparent and may optionally comprise a variable index material such as a liquid crystal. The reflective layer may be a metal, such as aluminum, silver or gold, or it may comprise a dielectric stack mirror. Consider, as an example, a fixed microfabricated optical wave plate according to FIG. 6B in which the substrate is glass with a wire grid polarizer built in, the dielectric layer is silicon dioxide and the reflective layer is aluminum. Such a wave plate may be built to provide the characteristics of a traditional quarter- or half-wave plate or in fact any traditional wave plate. The fixed microfabricated optical wave plate operates in reflection, however. Light is incident upon the structure in the direction indicated by arrow 645 and returns in the opposite direction. Another way to create a fixed microfabricated optical wave plate such as that illustrated in FIG. 6B is to start with a wire grid polarizer in a glass substrate, etch or polish the substrate to an appropriate thickness, and then coat the substrate with a reflective material such as aluminum, silver or gold. An appropriate thickness is one such that the optical path length between the wire grid polarizer and the reflective layer provides half the desired phase shift between orthogonal polarization components of light incident upon the polarizer. (The round trip optical path length is twice the one-way path length.)

In either of the structures illustrated in FIGS. 6A and 6B, the dielectric layer may be one having a fixed index of refraction, such as glass, or it may be a variable index material, such as a liquid crystal in an electric field. In FIG. 6A an electric field may be obtained by adding a transparent conductive layer such as indium tin oxide on top of the polarizer. A voltage applied between that layer and a metal reflective layer or a conductive substrate will create an electric field in the dielectric layer. In FIG. 6B a transparent conductive layer may be applied to the transparent substrate on the opposite side from the dielectric layer and the reflective layer. A voltage applied between that layer and a metal reflective layer will create an electric field in the dielectric layer. Further, if a fixed microfabricated optical wave plate is constructed by coating one side of a wire grid polarizer (having a glass substrate) with a reflective material such as aluminum, silver or gold, a voltage may then be applied between the wires of the wire grid polarizer and the reflective material.

The structures shown in FIGS. 6A and 6B may be fabricated using thin film techniques that are standard in semiconductor and MEMS wafer processing. The layers can be made thin enough that the optical path length between the polarizer and the mirror is a small number of optical wavelengths thereby increasing the optical bandwidth. This is in contrast to traditional birefringent wave plates where a true "zero order" wave plate can be challenging to fabricate. Furthermore, thin film techniques may be used to build multiple dielectric layers between the mirror and polarizer to create a "chirped" stack that further increases bandwidth. Alternatively the mirror itself may be constructed as a chirped dielectric stack.

FIG. 7 shows a microfabricated optical wave plate comprising a flexible, reflective membrane. In FIG. 7, a flexible membrane 710, such as a mylar membrane is supported over a reflective polarizer by supports 715. The membrane is made reflective by coating it with a thin layer of metal. In FIG. 7, polarizer 720 is illustrated as a wire grid polarizer. Inset 730 shows a magnified end-view of wires in a wire grid polarizer. The microfabricated optical wave plate shown in FIG. 7 operates similarly to that illustrated in FIG. 1. However, the distance between the mirror (i.e. the reflective, flexible membrane 710) and the polarizer in the device of FIG. 7 varies in response to mechanical pressure applied to the membrane. (Movement of the membrane may be detected with an apparatus similar to that of FIG. 2 or 4 for example.) An array of devices of the type shown in FIG. 7 could serve as a finger print reader since the ridges and valleys of a finger would depress flexible membranes in the array different distances. Air pressure variations in sound waves could move the membrane thereby creating a microphone. Similarly a gas pressure sensor or barometer would result when the space between the membrane and the polarizer/substrate was sealed to prevent intake or escape of gas. A membrane that stretches or contracts with variations in temperature could form the basis for a temperature sensor; an array of such devices would make a thermal imager. In short, the structure of FIG. 7 may be used to detect small movements of membrane 710, regardless of their origin.

Figure 8:
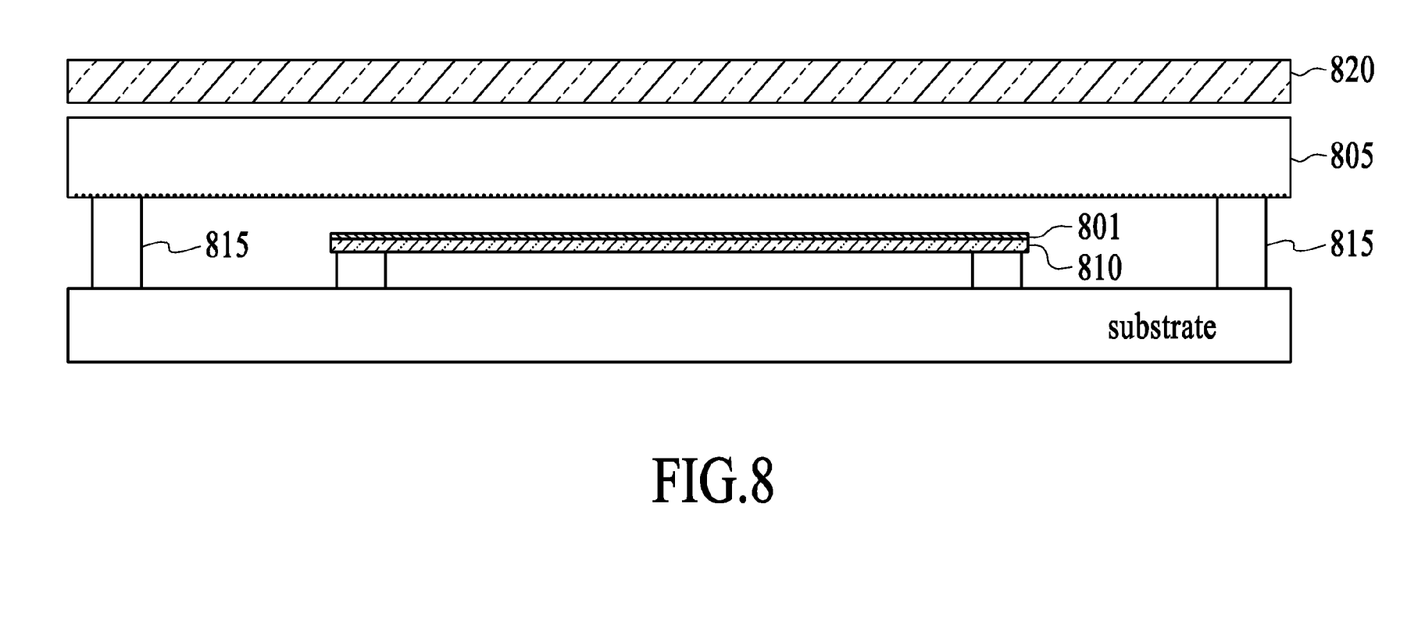
FIG. 8 shows a microfabricated optical wave plate and compensator constructed with silicon MEMS fabrication techniques.

FIG. 8 shows a microfabricated optical wave plate and compensator constructed with silicon MEMS fabrication techniques. In the figure a microfabricated optical wave plate is formed by reflective polarizer 805 and MEMS mirror 810. Compensator 820 is located such that incident light passes through it before reaching the microfabricated optical wave plate. Polarizer 805 may be a nanowire polarizer while MEMS mirror 810 may be a MEMS ribbon structure comprising a reflective coating such as coating 801. For example, the polarizer may be a Proflux™ Microwire™ polarizer while the MEMS ribbon structure may be fabricated from silicon nitride and coated with a thin layer of aluminum. Spacers 815 separate MEMS mirror 810 from nanowire polarizer 805. Compensator 820 may be a birefringent plate such as a quartz plate or a liquid crystal polymer layer or another type of birefringent optical element. MEMS ribbon technology has been widely described in connection with grating light modulators and polarization light modulators.

Figure 9:
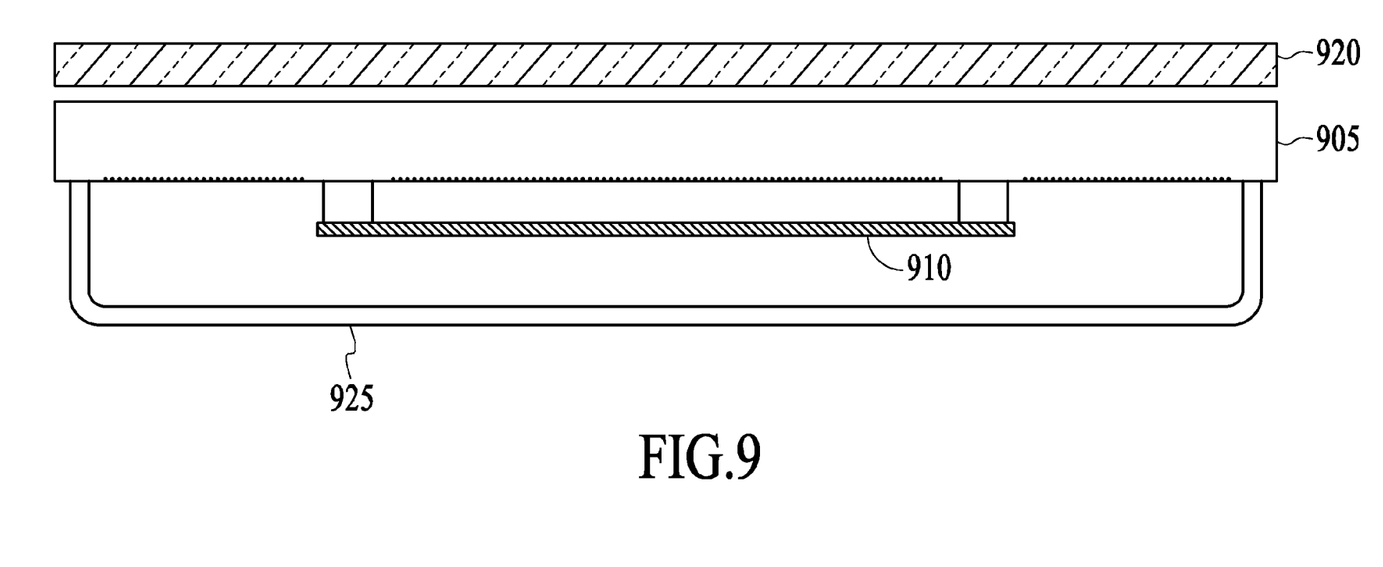
FIG. 9 shows an alternate arrangement to that shown in FIG. 5.

FIG. 9 shows an alternate arrangement to that shown in FIG. 8. In FIG. 9 MEMS mirror 910 is fabricated directly on nanowire polarizer 905; i.e. the polarizer acts as a substrate for MEMS processing needed to fabricate the mirror. Compensator 920 is located such that incident light passes through it before reaching the microfabricated optical wave plate as in FIG. 8. Protective cover 925 shields the finished device from contamination. In this design, nanowires in polarizer 905 may be used as the counter electrode to MEMS mirror 910. Therefore, the MEMS mirror should be electrically isolated from the nanowires.

Figure 10:
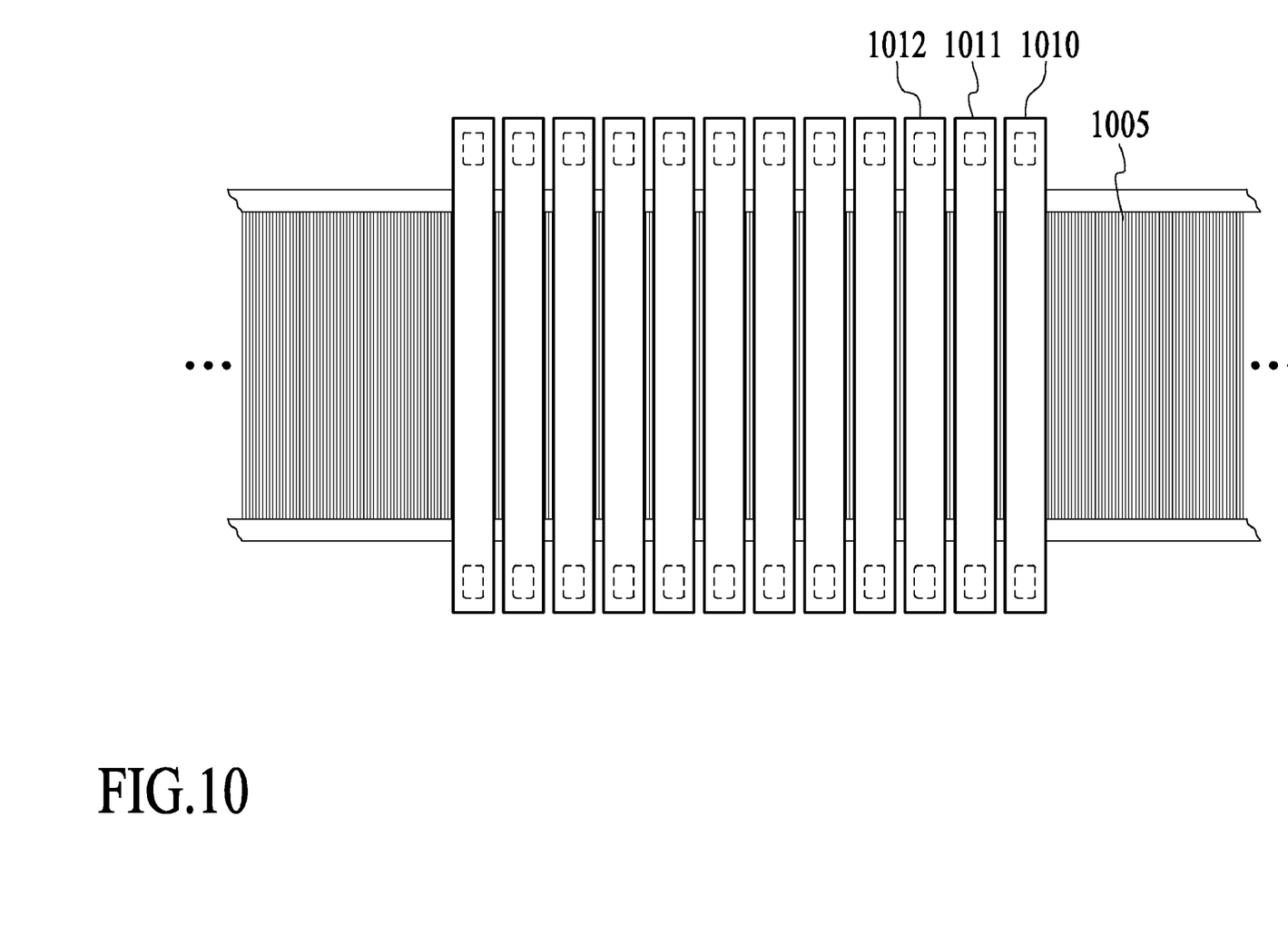
FIG. 10 shows a layout of a 1-D modulator array based on microfabricated optical wave plates.

FIG. 10 shows a layout of a 1-D modulator array based on microfabricated optical wave plates. In the figure, a one-dimensional array of MEMS ribbon mirror structures (e.g. structures such as those shown in FIG. 8 or FIG. 9) overlaps a nanowire polarizer 1005. When a voltage is applied between a ribbon (1010, 1011, 1012, etc.) and the polarizer, the spacing between the two is decreased in proportion to the square of the voltage. This general layout may be the basis of a light line modulator which forms 2-D images when its output is scanned in a direction perpendicular to the array.

Only a few ribbons are shown in FIG. 10; however, a 1-D modulator may comprise hundreds or even thousands of ribbons. Techniques for manufacturing 1-D arrays of microscopic ribbons have been extensively researched in connection with grating light modulators and polarization light modulators.

Figure 11:
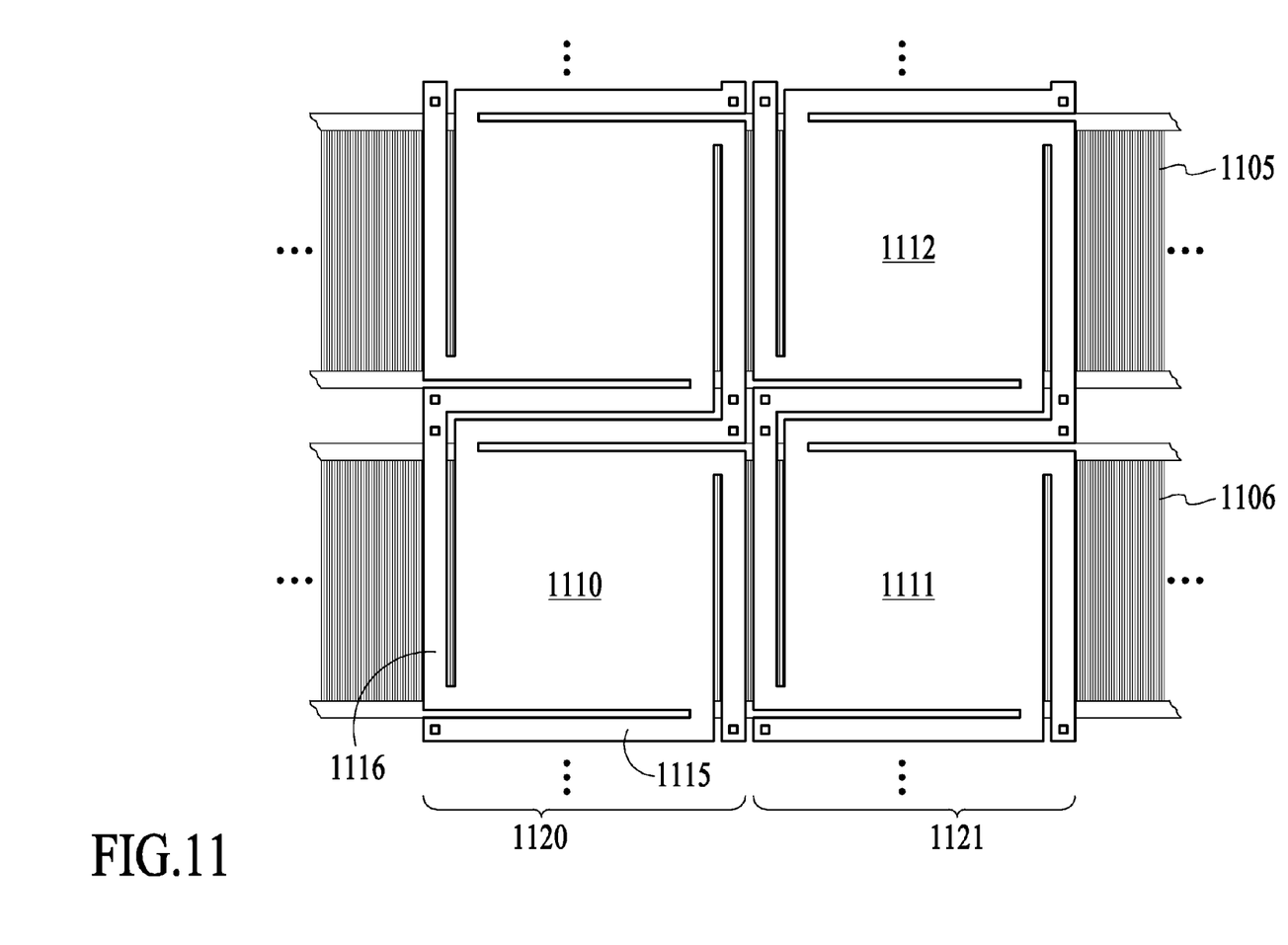
FIG. 11 shows a layout of a 2-D modulator array based on microfabricated optical wave plates.

FIG. 11 shows a layout of a 2-D modulator array based on microfabricated optical wave plates. In the figure, a two-dimensional array of MEMS mirrors (1110, 1111, 1112, etc.) overlaps a set of nanowire polarizers. The two-dimensional array of MEMS mirrors comprises rows of polarizers (such as rows 1105, 1106) and columns of mirrors (such as columns 1120, 1121). Each mirror in the array can be addressed by applying a voltage to the row and column containing the mirror.

The MEMS mirrors illustrated in the 2-D modulator array of FIG. 11 comprise flexures along each side (such as flexures 1115, 1116). This design provides for piston movement of the mirror; i.e. toward and away from the polarizers such that the plane of the polarizers and the plane of the mirror remain parallel when the mirror moves. There are many other possible MEMS mirror designs that can be used in combination with a nanowire polarizer to make an array of microfabricated optical wave plates, as 2-D MEMS mirror arrays have been extensively studied.

Only a 2×2 array is shown in FIG. 11; however, it is clear that the array may comprise thousands or even millions of mirror elements. Large arrays of microscopic mirrors have been developed by many different research groups and corporations.

The simplicity of the microfabricated optical wave plate contributes to its wide range of potential applications. It is a new optical element that provides rapidly adjustable, reflective birefringence. When combined with polarizers to prepare input polarization and analyze output polarization, the microfabricated optical wave plate may be used to make a display element or any of a number of physical sensors. In its fixed spacing form, the microfabricated optical wave plate is not adjustable, but offers wide bandwidth and operates in reflection.

As one skilled in the art will readily appreciate from the disclosure of the embodiments herein, processes, machines, manufacture, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, means, methods, or steps.

The above description of illustrated embodiments of the systems and methods is not intended to be exhaustive or to limit the systems and methods to the precise form disclosed.

While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above.

In general, in the following claims, the terms used should not be construed to limit the systems and methods to the specific embodiments disclosed in the specification and the claims, but should be construed to include all systems that operate under the claims. Accordingly, the systems and methods are not limited by the disclosure, but instead the scope of the systems and methods are to be determined entirely by the claims.

What is claimed is:

1. An optical device comprising:
   a reflective polarizer;
   a mirror; and,
   a mechanism to adjust the spacing between the polarizer and the mirror;
   wherein,
      the polarizer divides input light having an input polarization into a transmitted component having a transmitted polarization and a reflected component having a reflected polarization, orthogonal to the transmitted polarization, and
      the transmitted component propagates in a single round trip from the polarizer to the mirror and back to the polarizer where it is recombined with the reflected component to form output light having an output polarization different from the input polarization of the input light.

2. The device of claim 1 wherein the input light arrives at the polarizer at near-normal incidence.

3. The device of claim 1 wherein the polarizer is a wire grid polarizer.

4. The device of claim 1 wherein the mechanism is a micro-electromechanical system (MEMS).

5. A one dimensional array of devices of claim 4 wherein the micro-electromechanical system comprises a ribbon structure.

6. A two dimensional array of devices of claim 4 wherein the micro-electromechanical system comprises a rectangular mirror structure.

7. The device of claim 1 further comprising a birefringent compensator placed such that the polarizer lies between the compensator and the mirror.

8. The device of claim 7 wherein the birefringent compensator is oriented such that its fast axis is parallel to the transmitted polarization of the transmitted component that propagates from the polarizer to the mirror and back.

9. The device of claim 7 wherein the birefringent compensator comprises a liquid crystal.

10. An optical device comprising:
    a reflective polarizer;
    a mirror separated from the polarizer by a fixed spacing; and,
    a variable index material located between the polarizer and the mirror;
    wherein,
       the polarizer divides input light having an input polarization into a transmitted component having a transmitted polarization and a reflected component having a reflected polarization, orthogonal to the transmitted polarization, and
       the transmitted component propagates in a single round trip from the polarizer to the mirror and back to the polarizer where it is recombined with the reflected component to form output light having an output polarization different from the input polarization of the input light.

11. The device of claim 10 wherein the variable index material is a liquid crystal.

12. An optical device comprising:
    a reflective polarizer; and,
    a flexible mirror separated from the polarizer by spacers;
    wherein,
       the polarizer divides input light having an input polarization into a transmitted component having a transmitted polarization and a reflected component having a reflected polarization, orthogonal to the transmitted polarization, and
       the transmitted component propagates in a single round trip from the polarizer to the mirror and back to the polarizer where it is recombined with the reflected component to form output light having an output polarization different from the input polarization of the input light.

13. The device of claim 12 wherein the flexible mirror comprises a thin membrane coated with a metal.

14. The device of claim 12 wherein the polarizer is a wire grid polarizer.

15. An optical device comprising:
    a reflective polarizer; and,
    a mirror separated from the polarizer by a fixed spacing;
    wherein,
       the polarizer divides input light having an input polarization into a transmitted component having a transmitted polarization and a reflected component having a reflected polarization, orthogonal to the transmitted polarization,
       the transmitted component propagates in a single round trip from the polarizer to the mirror and back to the polarizer where it is recombined with the reflected component to form output light having an output polarization different from the input polarization of the input light, and
       the spacing is such that the round-trip optical path length between the polarizer and the mirror is equal to $(n+\frac{1}{2})$ times the wavelength of the input light where n is zero or a positive integer $(0, 1, 2, 3 \ldots)$.

16. The device of claim 15 wherein the polarizer is a wire grid polarizer.

17. The device of claim 15 wherein the mirror is a reflective metal layer on a solid substrate, the reflective polarizer is a wire grid polarizer, and the fixed spacing between the mirror and the polarizer is maintained by a solid dielectric layer.

18. An optical device comprising:
    a reflective polarizer; and,
    a mirror separated from the polarizer by a fixed spacing;
    wherein,
       the polarizer divides input light having an input polarization into a transmitted component having a transmitted polarization and a reflected component having a reflected polarization, orthogonal to the transmitted polarization,
       the transmitted component propagates in a single round trip from the polarizer to the mirror and back to the polarizer where it is recombined with the reflected component to form output light having an output polarization different from the input polarization of the input light, and the spacing is such that the round-trip optical path length between the polarizer and the mirror is equal to (n+¼) times the wavelength of the input light where n is zero or a positive integer (0, 1, 2, 3 . . . ).

19. The device of claim 18 wherein the polarizer is a wire grid polarizer.

20. The device of claim 18 wherein the mirror is a reflective metal layer on a solid substrate, the reflective polarizer is a wire grid polarizer, and the fixed spacing between the mirror and the polarizer is maintained by a solid dielectric layer.

* * * * *